3,382,234
PERFLUORO ALDEHYDE TREATMENT OF CELLULOSIC MATERIALS

Robert D. Englert, Sierra Madre, Ronald Swidler, Pasadena, Lester P. Berriman, Arcadia, and Robert H. Wade, Altadena, Calif., assignors, by mesne assignments, to Koratron Company, Inc., a corporation of California
No Drawing. Filed Feb. 15, 1965, Ser. No. 432,840
9 Claims. (Cl. 260—212)

ABSTRACT OF THE DISCLOSURE

The treatment of naturally occurring organic materials having accessible hydroxyl groups with perfluoro alkanals to produce stable acetals. Fabrics treated by the process are rendered water repellant without undergoing a substantial decrease in the permeability of the fabrics to water vapor.

---

The present invention is directed to a process for treating cellulosic and other naturally occurring organic materials such as starch which have accessible hydroxyl groups with perfluoro aldehydes and the products produced thereby. The present invention is particularly useful for the treatment of cellulosic materials such as cotton to provide a variety of highly desirable properties including water resistance and soil resistance to such materials.

Although a substantial amount of research and development work has been devoted to the chemical modification of cellulosic materials in recent years, many commercially available cellulosic fabrics which have been commercially treated do not possess permanent water resistance and/or permanent soil resistance. Rather, as is well known to the consumers of these articles, the water repellency of many raincoats and the like comprising treated cellulosic fibers and the soil resistance of many fabrics comprising treated cellulosic fibers is substantially destroyed by laundering and other cleaning methods with the result that subsequent treatment is necessary to restore water and/or soil resistance. The present invention provides an extremely effective and convenient method for permanently imparting water resistance and wrinkle recovery to cellulosic and similar materials.

It is an object of the present invention to provide a process for imparting permanent water resistance to cellulosic materials and the like.

It is another object of the present invention to provide a process for crosslinking cellulosic materials and the like with perfluoro aldehydes.

Other objects and advantages of the present invention, it is believed, will be apparent from the following detailed description of specific embodiments thereof.

Briefly, the present invention comprises the treatment of naturally occurring organic materials having accessible hydroxyl groups, e.g., cotton, regenerated cellulose, starch, etc., with perfluoro aldehyde compositions. Thus, the perfluoro compositions which may be used in the present invention have the formula:

$$CR_3-CHO \text{ or } CF_3RCHO \qquad (1)$$

wherein R may be $(CF_2)_n$ or may be a branched chain perfluoro radical. The value of $n$ in $(CF_2)_n$ is limited only by the extent to which long chains will prevent penetration of the perfluoro compound into the interior of the cellulosic or other molecules and thereby prevent effective reaction. However, since such penetration may be aided by swelling the celluosic or other material or by appropriate solvent exchange systems, and since such penetration will depend on the nature of the cellulosic or other material, the quantitative limit on $n$ will vary in different reaction systems.

The use of perfluoro octanal has been found quite satisfactory in the present invention, but it is to be emphasized that any compounds which meet the foregoing requirements may be used.

Although the present invention is not to be limited to any particular theory of operation, it is believed that the perfluoro aldehydes react with the hydroxyl groups in the cellulosic or other materials with which they are reacted to produce stable hemi and diacetals. It is further believed that diacetal formation will produce crosslinking. Such crosslinking would be expected to improve the wrinkle recovery properties possessed by the cellulosic products of the present invention.

Among the many unique features of the present invention is the facility with which cotton may be reacted with perfluoro aldehydes under non-degradative conditions. As is well known to those skilled in the art, many reactions which can be performed with some cellulosic materials cannot be performed, or can be performed only with great difficulty, when cotton is used. Thus, the reactions of the present invention are unique in this regard.

Another important feature of the present invention is that it permits cotton and similar fabrics to be rendered water repellent without substantially decreasing the permeability of such fabrics to water vapor. Thus, a fabric treated according to the present invention will have increased water repellency and will also be able to "breathe" because of its permeability to water vapor.

The reactions of the present invention may be carried out in the presence of an acid catalyst. However, this is not essential. Among the catalysts which may be used are hydrochloric acid and zinc chloride.

The present invention is further illustrated by the following example in which all proportions are expressed in parts or percent by weight.

Example

A piece of cotton cloth was shaken vigorously in a sealed tube for three days in 150 ml. of methylene chloride containing 5 grams of $C_7F_{15}CHO$. The cloth was then dried for 7 minutes at 60° C. and cured for 3 minutes at 160° C. This material was then tested for water resistance according to ASTM test D583–58. In this test, 100% water repellency is maximum.

The water repellency of the fabric treated according to this example was found to be 50%. This test result compared favorably with a control sample which was found to have a water repellency of 0%.

The amount of fluorine added to the cotton fabric treated according to this example was found to be less than 1%.

Having fully described our invention, it is to be understood that we do not wish to be limited to the details set forth, but our invention is of the full scope of the appended claims.

We claim:
1. A process comprising reacting a perfluoro alkanal with a cellulosic material to effect crosslinking.
2. A process comprising reacting a perfluoro alkanal with cotton to effect crosslinking.
3. A process comprising reacting a perfluoro alkanal with starch to effect crosslinking.
4. A process comprising reacting a perfluoro octanal with cotton.
5. The process of claim 1 wherein said reaction is carried out in the presence of an acid catalyst.
6. A composition comprising crosslinked cellulosic material, said material being crosslinked by perfluorodiacetal linkage in an amount sufficient to improve any of the properties of wrinkle recovery, water resistance or soil resistance.

7. Crosslinked cotton wherein perfluorodiacetal groups are the crosslinking linkages and are present in an amount sufficient to improve any of the properties of wrinkle recovery, water resistance or soil resistance.

8. A composition comprising the perfluorohemiacetal of a cellulosic material, said hemiacetal being present in an amount sufficient to improve any of the properties of wrinkle recovery, water resistance or soil resistance.

9. The composition comprising a perfluorohemiacetal of cotton, said hemiacetal being present in an amount sufficient to improve any of the properties of wrinkle recovery, water resistance or soil resistance.

No references cited.

DONALD E. CZAJA, *Primary Examiner.*

R. W. MULCAHY, *Assistant Examiner.*